United States Patent
Zhang et al.

(10) Patent No.: US 8,107,201 B2
(45) Date of Patent: Jan. 31, 2012

(54) HARD BIAS DESIGN FOR EXTRA HIGH DENSITY RECORDING

(75) Inventors: Kunliang Zhang, Santa Clara, CA (US); Yun-Fei Li, Fremont, CA (US); Chyu-Jiuh Torng, Pleasanton, CA (US); Chen-Jung Chien, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/660,908

(22) Filed: Mar. 5, 2010

(65) Prior Publication Data

US 2010/0172053 A1 Jul. 8, 2010

Related U.S. Application Data

(62) Division of application No. 10/868,716, filed on Jun. 15, 2004, now Pat. No. 7,688,555.

(51) Int. Cl.
*G11B 5/39* (2006.01)
*G11B 5/127* (2006.01)

(52) U.S. Cl. ............................. 360/324.12; 360/327.31

(58) Field of Classification Search ............. 360/324.12, 360/327.3, 327.31, 327.23
See application file for complete search history.

(56) References Cited

U.S. PATENT DOCUMENTS

| | | | | |
|---|---|---|---|---|
| 5,434,826 A | * | 7/1995 | Ravipati et al. ............... | 367/140 |
| 5,748,416 A | * | 5/1998 | Tobise et al. ............. | 360/324.12 |
| 5,959,810 A | * | 9/1999 | Kakihara et al. ......... | 360/324.12 |
| 6,118,624 A | * | 9/2000 | Fukuzawa et al. ....... | 360/324.12 |
| 6,266,218 B1 | * | 7/2001 | Carey et al. ............... | 360/324.12 |
| 6,270,588 B1 | | 8/2001 | Takano et al. | |
| 6,351,357 B1 | * | 2/2002 | Xue et al. .................. | 360/327.31 |
| 6,353,318 B1 | * | 3/2002 | Sin et al. ........................ | 324/252 |
| 6,512,661 B1 | | 1/2003 | Louis | |
| 6,519,121 B1 | | 2/2003 | Gill | |
| 6,587,315 B1 | * | 7/2003 | Aoki et al. ..................... | 360/322 |
| 6,643,107 B1 | | 11/2003 | Hasegawa et al. | |
| 6,668,443 B2 | * | 12/2003 | Chien et al. ................. | 29/603.18 |
| 6,828,046 B2 | | 12/2004 | Ikeda et al. | |
| 6,934,129 B1 | * | 8/2005 | Zhang et al. ................... | 360/322 |
| 6,967,824 B2 | * | 11/2005 | Marinero .................. | 360/324.12 |
| 7,193,822 B2 | * | 3/2007 | Shimizu et al. ............. | 360/324.1 |
| 7,248,448 B2 | * | 7/2007 | Fukuzawa et al. ........ | 360/324.12 |
| 7,515,388 B2 | * | 4/2009 | Zhang et al. ............. | 360/324.12 |

(Continued)

FOREIGN PATENT DOCUMENTS

JP 10269531 A * 10/1998

*Primary Examiner* — Brian Miller (74) *Attorney, Agent, or Firm* — Saile Ackerman LLC; Stephen B. Ackerman (57) ABSTRACT

A hard bias structure for biasing a free layer in a MR element within a read head is comprised of a composite hard bias layer having a $Co_{78.6}Cr_{5.2}Pt_{16.2}/Co_{65}Cr_{15}Pt_{20}$ configuration. The upper $Co_{65}Cr_{15}Pt_{20}$ layer has a larger Hc value and a thickness about 2 to 10 times greater than that of the $Co_{78.6}Cr_{5.2}Pt_{16.2}$ layer. The hard bias structure may also include a BCC underlayer such as FeCoMo which enhances the magnetic moment of the hard bias structure. Optionally, the thickness of the $Co_{78.6}Cr_{5.2}Pt_{16.2}$ layer is zero and the $Co_{65}Cr_{15}Pt_{20}$ layer is formed on the BCC underlayer. The present invention also encompasses a laminated hard bias structure. The Mrt value for the hard bias structure may be optimized by adjusting the thicknesses of the BCC underlayer and CoCrPt layers. As a result, a larger process window is realized and lower asymmetry output during a read operation is achieved.

8 Claims, 3 Drawing Sheets

U.S. PATENT DOCUMENTS

| | | | |
|---|---|---|---|
| 7,688,555 B2* | 3/2010 | Zhang et al. | 360/324.12 |
| 2001/0014000 A1* | 8/2001 | Tanaka et al. | 360/324.12 |
| 2002/0048690 A1* | 4/2002 | Fukuzawa et al. | 428/692 |
| 2003/0030947 A1* | 2/2003 | Ooshima | 360/324.12 |
| 2004/0196597 A1* | 10/2004 | Marinero | 360/324.12 |
| 2005/0264955 A1* | 12/2005 | Freitag et al. | 360/324.12 |
| 2005/0276997 A1* | 12/2005 | Hasegawa et al. | 428/811.3 |

* cited by examiner

HARD BIAS DESIGN FOR EXTRA HIGH DENSITY RECORDING

This is a Divisional application of U.S. patent application Ser. No. 10/868,716, filed on Jun. 15, 2004, now U.S. Pat. No. 7,688,555 which is herein incorporated by reference in its entirety, and assigned to a common assignee.

FIELD OF THE INVENTION

The invention relates to an improved hard bias structure formed adjacent to a giant magnetoresistive (GMR) sensor in a magnetic read head and a method for making the same. In particular, a composite hard bias layer on a body centered cubic (BCC) underlayer is disclosed that achieves a high coercivity while minimizing asymmetry sigma in a read operation.

BACKGROUND OF THE INVENTION

A magnetic disk drive includes circular data tracks on a rotating magnetic disk and read and write heads that may form a merged head on a slider that is attached to a positioning arm. During a read or write operation, the merged head is suspended over the magnetic disk on an air bearing surface (ABS). The sensor in a read head is a critical component in which different magnetic states are detected by passing a sense current there through and monitoring a resistance change. One form of magneto-resistance is a spin valve magnetoresistance (SVMR) or giant magnetoresistance (GMR) which is based on a configuration in which two ferromagnetic layers are separated by a non-magnetic conductive layer in the sensor stack. One of the ferromagnetic layers is a pinned layer in which the magnetization direction is fixed by exchange coupling with an adjacent anti-ferromagnetic (AFM) pinning layer. The second ferromagnetic layer is a free layer in which the magnetization vector can rotate in response to external magnetic fields. In the absence of an external magnetic field, the magnetization direction of the free layer is aligned perpendicular to that of the pinned layer by the influence of abutting hard bias layers. When an external magnetic field is applied by passing the sensor over a recording medium on the ABS plane, the magnetic moment of the free layer may rotate to a direction which is parallel to that of the pinned layer. A sense current is used to detect a resistance value which is lower when the magnetic moments of the free layer and pinned layer are parallel.

In a CPP configuration, a sense current is passed through the sensor in a direction perpendicular to the layers in the sensor stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the cross-sectional area of the sensor is typically smaller than 0.1×0.1 microns at the ABS plane. Current recording head applications are typically based on an abutting junction configuration in which a hard bias layer is formed adjacent to each side of a free layer in a GMR spin valve structure. As the recording density further increases and track width decreases, the junction edge stability becomes more important so that edge demagnification in the free layer is prevented. In other words, horizontal (longitudinal) biasing is necessary so that a single domain magnetization state in the free layer will be stable against all reasonable perturbations. The critical dimensions for sensor elements become smaller with higher recording density requirements and therefore the minimum longitudinal bias field necessary for free layer domain stabilization increases.

A high coercivity in the in-plane direction is needed in the hard bias layer to provide a stable longitudinal bias that maintains a single domain state in the free layer and thereby avoids undesirable Barkhausen noise. By arranging the flux flow of the free layer to be equal to the flux flow of the hard bias film, there are no magnetic poles at the abutting junction edges and the demagnetizing field in that vicinity becomes zero. This condition is realized when there is a sufficient in-plane remnant magnetization (Mr) which may also be expressed as Mrt since Mr is dependent on the thickness of the hard bias layer. Mrt is the component that provides the longitudinal bias flux to the free layer and must be high enough to assure a single magnetic domain in the free layer but not so high as to prevent the magnetic field in the free layer from rotating under the influence of a reasonably sized external magnetic field. Moreover, a high saturation magnetization (Ms) and a high squareness (S) value for Mr/Ms that approaches 1 in the hard bias layer is desired.

Figure 1:
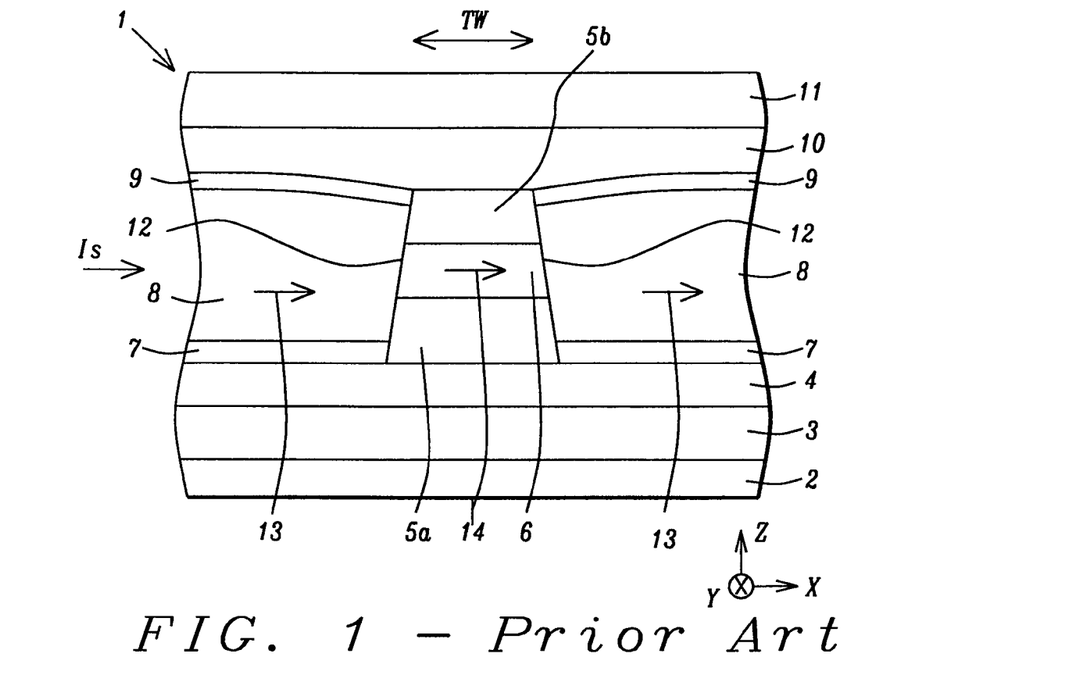
FIG. 1 is a cross-sectional view showing a prior art magnetic read head with a GMR element, a seed layer formed on a gap layer and along the sidewalls of the GMR element, and a hard bias layer on the seed layer.

Referring to FIG. 1, a conventional read head 1 based on a GMR configuration is shown and is comprised of a substrate 2 upon which a first shield layer 3 and a first gap layer 4 are formed. There is a GMR element comprised of a bottom portion 5a, a free layer 6, and a top portion 5b formed on the first gap layer 4. Note that the GMR element generally has sloped sidewalls wherein the top portion 5b is not as wide as the bottom portion 5a. The GMR element may be a bottom spin valve in which an AFM pinning layer and pinned layer (not shown) are in the bottom portion 5a or the GMR element may be a top spin valve where the AFM and pinned layers are in the top portion 5b. There is a seed layer 7 formed on the first gap layer 4 and along the GMR element which ensures that the subsequently deposited hard bias layers 8 have a proper microstructure. Hard bias layers 8 form an abutting junction 12 on either side of the free layer 6. Leads 9 are provided on the hard bias layers 8 to carry current to and from the GMR element. The distance between the leads 9 defines the track width TW of the read head 1. Above the leads 9 and GMR element are successively formed a second gap layer 10 and a second shield layer 11.

The pinned layer in the GMR element is pinned in the Y direction by exchange coupling with an adjacent AFM layer that is magnetized in the Y direction by an annealing process. The hard bias layers 8 which are made of a material such as CoCrPt are magnetized in the X direction as depicted by vectors 13 and influence an X directional alignment of the magnetic vector 14 in the free layer 6. When a magnetic field of sufficient strength is applied in the Y direction from a recording medium by moving the read head 1 over a hard disk (not shown) in the Z direction, then the magnetization in the free layer switches to the Y direction. This change in magnetic state is sensed by a voltage change due to a drop in the electrical resistance for an electrical current that is passed through the MR element. In a CIP spin valve, this sense current $I_S$ is in a direction parallel to the planes of the sensor stack.

One concern about the output from a spin valve element during a feed back (read) operation is that the asymmetry sigma should be as small as possible in order to accurately reproduce the waveform from the recording medium. Asymmetry is determined by the variable magnetization direction of the free layer. Ideally, the magnetic moment 14 of the free layer 6 is orthogonal to the magnetic moment of the pinned layer when no external magnetic field is present. However, the actual angle between the aforementioned magnetic moments usually deviates somewhat from 90° because of other magnetic forces in the GMR element and thereby produces an asymmetric waveform in the output.

Figure 2:
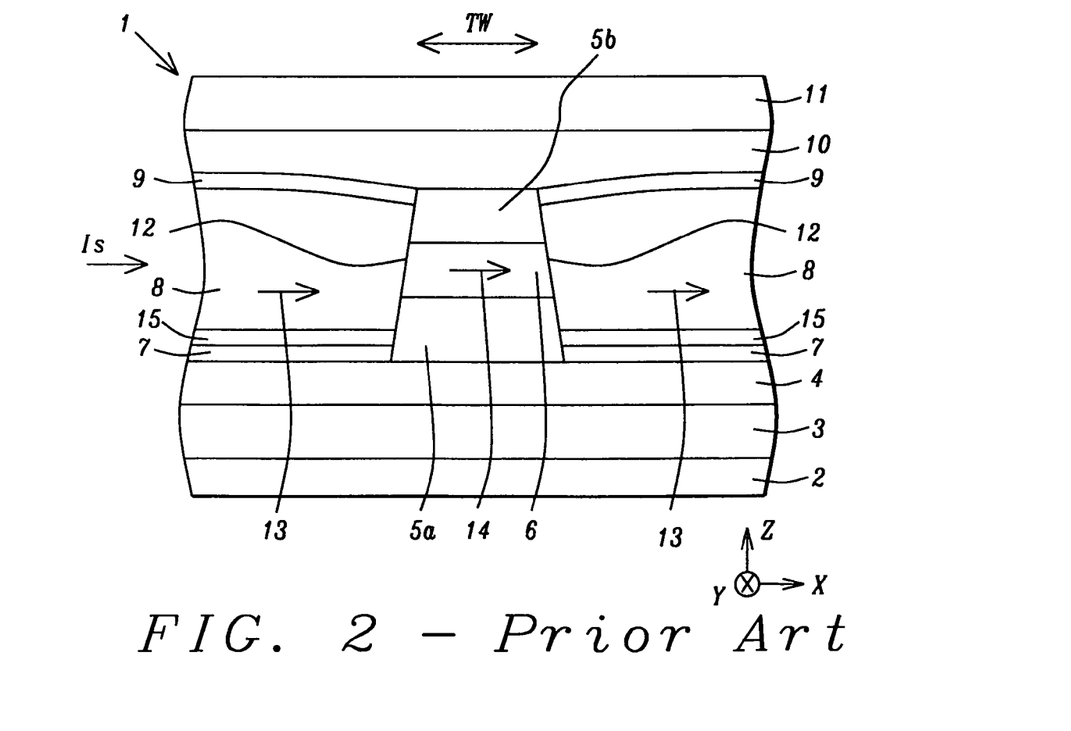
FIG. 2 is a cross-sectional view of a prior art magnetic read head in which a hard bias structure comprised of a hard bias layer and an underlayer is formed on a seed layer and adjacent to a GMR element.

A soft magnetic film with a high saturation flux density and comprised of FeCoMo is employed as a magnetic pole layer in U.S. Patent Publication 2002/0150790. Referring to FIG. 2, those skilled in the art would recognize that a FeCoMo layer can be used to modify the read head in FIG. 1 by inserting a FeCoMo underlayer 15 with a high magnetic moment between the seed layer 7 and the hard bias layer 8 (FIG. 2). The underlayer 15 improves the biasing efficiency and serves to reduce output asymmetry. A further improvement in signal amplitude and asymmetry is expected if the FeCoMo layer (or moment) can be increased while the total Mrt is maintained or further reduced and the coercivity is maintained. Unfortunately, the thickness of a FeCoMo underlayer and the associated magnetic moment contribution is limited because a thicker FeCoMo film leads to a loss of coercivity (Hc) in the hard bias layer 8. Thus, a new hard bias structure is needed which allows the thickness of a body centered cubic (BCC) underlayer such as FeCoMo to be increased without lowering $H_C$ in the adjacent hard bias layer. A combination of high coercivity to enhance edge junction pinning efficiency and a higher moment contribution from a BCC underlayer to further reduce asymmetry sigma has not been achieved in prior art hard bias structures to our knowledge.

In U.S. Pat. No. 6,643,107, the electrode layers on both sides of a GMR element are extended toward the center of a bottom spin valve and are located above a backed (conductive) layer on a free layer. This structure prevents dead zones at the edges of the free layer and improves output characteristics including asymmetry.

An MR sensor is described in U.S. Pat. No. 6,270,588 in which the Hex angle that is the angle between the direction of the exchange coupling magnetic bias applied to the pinned layer and the longitudinal bias direction is more than 90° in at least a portion of the pinned layer. As a result, improved wave shape and better wave symmetry is achieved.

An insulating hard bias layer made of cobalt ferrite or the like is used in U.S. Pat. No. 6,512,661 to avoid shunting of current away from a MR sensor which occurs with a conductive hard bias layer. A larger flux decay length is also provided which leads to a higher density recording capability.

In U.S. Pat. No. 6,519,121, a spin valve sensor with a composite pinned layer to improve biasing of the free layer is described. A CoFeHfO layer is formed on an AFM layer and a CoFe layer is formed on the CoFeHfO layer and adjacent to a spacer layer in a MR element. This configuration minimizes sense current shunting and improves the magnetoresistive effect.

SUMMARY OF THE INVENTION

One objective of the present invention is to provide a hard bias structure in which the thickness of a BCC underlayer component is increased to enhance its moment contribution while maintaining a high coercivity (Hc) for the hard bias structure.

A further objective of the present invention is to provide a composite hard bias layer that has a high Hc value and has good lattice matching with a BCC underlayer formed according to the first objective.

A still further objective of the present invention is to provide a method of making a hard bias structure that is comprised of a BCC underlayer and one or more hard bias layers in order to provide optimum Hc and Mrt values and a reduced asymmetry output.

These objectives are achieved in a first embodiment in which a GMR element with sidewalls and a top surface is formed on a first gap layer on a substrate in a magnetic read head. The GMR element can have a top spin valve or a bottom spin valve structure that is formed along an ABS plane and is comprised of an AFM layer, a pinned layer, a free layer, and a top surface that may be on a capping layer. The pinned layer is pinned in a first direction perpendicular to the ABS plane and parallel to the top surface of the substrate by exchange coupling with the magnetized AFM layer. A seed layer with a body centered cubic (BCC) lattice structure is formed on the first gap layer adjacent to the GMR element. A hard bias structure is formed on a seed layer along each side of the GMR element and contacts a substantial portion of the sidewalls in the GMR element to form abutting junctions with the free layer. In one aspect, the hard bias structure is comprised of a BCC underlayer and a composite hard bias layer that has a lower $Co_{78.6}Cr_{5.2}Pt_{16.2}$ layer and an upper $Co_{65}Cr_{15}Pt_{20}$ layer. Alternatively, the hard bias structure comprises a BCC underlayer and an overlying $Co_{65}Cr_{15}Pt_{20}$ layer. The BCC underlayer is preferably a ferromagnetic layer made of FeCoMo, for example, with a high magnetic moment and that has good lattice matching with the overlying hard bias layer.

The hard bias structure is magnetized in a direction orthogonal to that of the pinned layer and parallel to the top surface of the substrate. The hard bias structure is magnetically coupled to the free layer and provides a longitudinal (in-plane) bias that enables a single magnetic domain within the free layer. Electrical leads are formed above the hard bias structure and contact the GMR element along its sidewalls near the top surface of the capping layer. A second gap layer is formed on the leads and on the GMR element and a second shield layer is formed on the second gap layer to complete the magnetic read head.

In a second embodiment, the magnetic read head includes the same layers as in the first embodiment except that the hard bias structure is laminated such that the BCC underlayer/$Co_{78.6}Cr_{5.2}Pt_{16.2}/Co_{65}Cr_{15}Pt_{20}$ configuration is repeated a plurality of times. Alternatively, the BCC underlayer/$Co_{65}Cr_{15}Pt_{20}$ configuration is repeated a plurality of times. The thickness of the individual layers may be adjusted so that the hard bias structure has optimum Hc and Mrt values and provides a stable longitudinal bias to an adjacent free layer in the GMR element.

The present invention is also a method of forming a magnetic read head comprised of an improved hard bias structure according to the first and second embodiments. A stack of GMR layers comprised of a free layer, pinned layer, an AFM layer, and a cap layer is formed on a first gap layer on a substrate by a conventional method. Known methods are also employed to pattern a photoresist mask above the cap layer in the GMR stack. An etch process is used to define a GMR element and a track width. A seed layer is deposited on exposed portions of the first gap layer adjacent to the GMR element. An important step is formation of a hard bias structure on the seed layer and along a substantial portion of the sidewalls on the GMR element. The hard bias structure is formed by a magnetron sputtering or ion beam deposition (IBD) method that sequentially forms a BCC underlayer and a hard bias layer comprised of $Co_{65}Cr_{15}Pt_{20}$ or a $Co_{78.6}Cr_{5.2}Pt_{16.2}/Co_{65}Cr_{15}Pt_{20}$ configuration.

Alternatively, the hard bias structure may be laminated in which the BCC underlayer/$Co_{78.6}Cr_{5.2}Pt_{16.2}/Co_{65}Cr_{15}Pt_{20}$ configuration or the BCC underlayer/$Co_{65}Cr_{15}Pt_{20}$ configuration is repeated a plurality of times. The thicknesses of the individual layers within the hard bias structure are adjusted to provide optimum Hc and Mrt values while minimizing the asymmetry sigma in the output signal during a read operation.

The hard bias structure may be magnetically aligned in a direction parallel to the top surface of the GMR element and parallel to the ABS by applying an external magnetic field during or after the deposition step. Electrical leads are subsequently formed on the hard bias structure by a conventional method. The photoresist layer is then removed by a lift-off process, for example. The second gap layer and second shield layer are sequentially formed on the electrical leads and GMR element by well known methods.

DETAILED DESCRIPTION OF THE INVENTION

The present invention is an improved hard bias structure in a magnetic read head that has a high coercivity and a low output asymmetry during a read operation. The hard bias structure is useful in magnetic read heads that are based on CIP spin valves or CPP spin valves and is also applicable to MTJ devices or multi-player sensor designs as appreciated by those skilled in the art. The drawings are provided by way of example and are not intended to limit the scope of the invention. For example, the shape of a GMR element in the read head is not a limitation and the present invention is equally applicable to any configuration where a hard bias structure according to the first or second embodiment forms an abutting junction with a free layer in a GMR element. Moreover, the GMR element may be comprised of either a top spin valve or a bottom spin valve. The present invention is also a method of forming a magnetic read head with a hard bias structure according to the first or second embodiment that has high Hc and S values and sufficient in-plane flux density to ensure a single magnetic domain state in an adjacent free layer.

Figure 3:
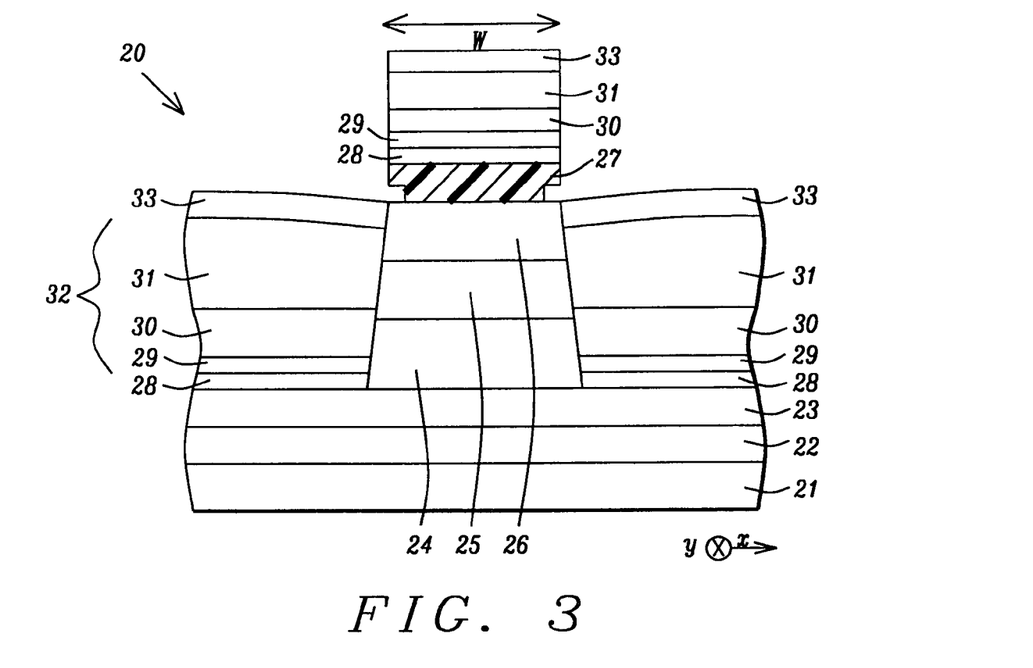
FIG. 3 is a cross-sectional view that shows an intermediate step in the method of forming a hard bias structure in a magnetic read head according to a first embodiment of the present invention.
Figure 4:
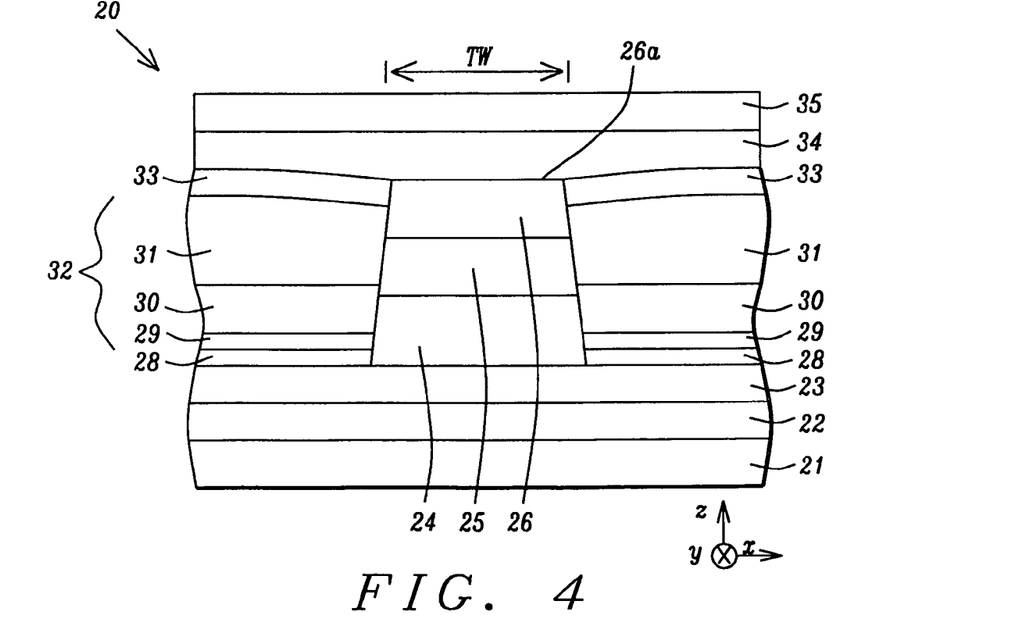
FIG. 4 is a cross-sectional view of a magnetic read head in which a hard bias structure comprised of a CoCrPt composite hard bias layer is formed on an underlayer and adjacent to a free layer in a GMR element.

A first embodiment is depicted in FIGS. 3-4. Referring to FIG. 3, a cross-sectional view from an ABS plane is shown of a magnetic read head 20 which has a substrate 21 that may be a ceramic layer, for example. A first shield layer 22 is formed on the substrate 21 and a first gap layer 23 is formed on the first shield layer by a conventional method. There is a GMR element which is a stack comprised of a bottom portion 24, a free layer 25, and a top portion 26 sequentially formed on the first gap layer 23. The GMR element typically has sloped sidewalls wherein the top portion 26 has a smaller width than the bottom portion 24.

The GMR element is fabricated by sequentially depositing the layers within the bottom portion 24, the free layer 25, and the layers within the top portion 26 by a sputtering technique, for example, which is well known in the art. A photoresist layer 27 is patterned on the top portion 26 and then an etch process is used to remove regions of the GMR stack that are not covered by the photoresist layer 27. The etch stops on the first gap layer 23 which may be $Al_2O_3$ or silicon oxide. Note that the photoresist layer 27 typically has an undercut along both sides at its interface with the top portion 26 of the GMR element to facilitate a subsequent lift-off removal step.

In one embodiment that represents a bottom spin valve, the bottom portion 24 is comprised of a seed layer such as NiCr on which an anti-ferromagnetic (AFM) pinning layer, a pinned layer, and a spacer layer which may be Cu are sequentially formed. The individual layers within the bottom portion 24 are not shown in order to simplify the drawing and direct attention to the abutting junction between the free layer 25 and the subsequently deposited hard bias structure. The AFM layer may be a PtMn or IrMn layer that is magnetized in the y direction. The AFM layer is exchange coupled to the pinned layer that may be comprised of CoFe and which is pinned in the y direction.

Optionally, the pinned layer may have a synthetic anti-parallel (SyAP) configuration in which a coupling layer such as Ru is sandwiched between an AP2 pinned layer on the AFM layer and an overlying AP1 pinned layer. The AP2 layer has a magnetic moment or vector oriented in the y direction by exchange coupling with an AFM pinning layer. The AP1 layer is adjacent to the spacer and is anti-parallel exchange coupled to the AP2 layer via the coupling layer as is understood by those skilled in the art. Thus, the magnetic moment or vector of the AP1 pinned layer is oriented in the "–y" direction which is anti-parallel to the magnetic vector of the AP2 layer. The magnetic moments of the AP2 and AP1 layers combine to produce a net magnetic moment that is less than the magnetic moment of a single pinned layer. A small net magnetic moment results in improved exchange coupling between the AP2 layer and the AFM layer and also reduces interlayer coupling between the AP1 layer and the free layer 25.

The free layer 25 may be comprised of CoFe and/or NiFe, for example, and has a thickness of about 20 to 50 Angstroms. The magnetization of the free layer 25 is oriented in the x direction under the influence of a longitudinal bias from the adjoining hard bias structure which is magnetized in the x direction and will be described in a later section. In the bottom spin valve structure, the top portion 26 of the GMR element is comprised of a cap layer such as Ta or Ru, for example. Optionally, the cap layer may be comprised of more than one layer such as a layer of NiCr on a layer of tantalum oxide.

In an alternative embodiment that represents a top spin valve, the bottom portion 24 may be comprised of a seed layer such as NiCr and an optional buffer layer (not shown) in which a layer of Ru is formed on the seed layer and a copper layer is formed on the Ru layer to provide a lattice match to the overlying free layer 25. The magnetization and composition of the free layer 25 are the same as described previously. Above the free layer in the top portion 26 are sequentially formed a spacer, a pinned layer which may have a SyAP configuration, an AFM layer, and a cap layer. The aforementioned layers have the same composition and magnetization direction as in the previously described bottom portion of the bottom spin valve structure. The layers in the top portion 26 of the top spin valve embodiment are not shown in order to simplify the drawing and direct attention to the abutting junction formed between the free layer 25 and the hard bias structure on either side of the GMR element.

In the presence of an appropriately sized external magnetic field which can be applied when the magnetic head 20 is passed over a magnetic recording medium in the z direction, the magnetization direction in the free layer 25 switches to the y or −y direction. The changed magnetic state in the free layer 25 may be sensed by passing a current through the GMR element to detect a lower resistance than when the magnetization of the pinned layer and free layer are orthogonal to each other.

Next, a seed layer 28 such as CrTi with a thickness between about 10 and 100 Angstroms and preferably about 30 Angstroms is deposited on the first gap layer 23 by a sputtering method or ion beam deposition (IBD). Alternatively, the seed layer 28 may be one of TiW, CrMo, or other materials that have a body centered cubic (BCC) lattice structure and have good lattice matching with a subsequently deposited underlayer and hard bias layer.

An important feature of the present invention is the hard bias structure 32 which is deposited on the seed layer 28. In one aspect, the hard bias structure 32 is comprised of a stack of layers including an underlayer 29 formed on the seed layer 28 and a composite hard bias layer disposed on the underlayer 29. The composite hard bias layer consists of a lower hard bias layer 30 hereafter referred to as HB1 and an upper hard bias layer 31 hereafter referred to as HB2. In the exemplary embodiment, the hard bias structure is formed by a sputtering or IBD method. Optionally, the composite hard bias layer may be formed directly on the seed layer 28 by omitting the underlayer 29 although this arrangement is generally less desirable.

In one embodiment, the underlayer 29 is a FeCoMo layer that has a composition represented by $Fe_RCo_SMo_T$ wherein R, S, and T are the atomic % of Fe, Co, and Mo, respectively, and wherein R+S+T=100 and R is from about 10 to 90, S is between about 10 and 90, and T is from about 5 to 20. Preferably, the thickness of the underlayer 29 is from about 5 to 40 Angstroms but may vary depending upon the desired thickness of the hard bias structure and the thickness of the overlying composite hard bias layer. The underlayer 29 has a high magnetic moment and a lattice structure intermediate between that of the seed layer 28 and the HB1 layer 30 in order to provide good lattice matching. Optionally, the underlayer 29 may be made of a BCC ferromagnetic material such as FeCo, FeCoCr, FeCr, FeV, FeTa, FePd, FeHf, FePt, FeW, or the like that has a high magnetic moment represented by the equation $4\pi Ms \geq 10000$ and which has good lattice matching with hard bias layers such as those based on a CoCrPt alloy.

In one embodiment, the HB1 layer 30 is comprised of a CoCrPt alloy that has a composition represented by $Co_XCr_YPt_Z$ in which X, Y, and Z are the atomic % of Co, Cr, and Pt, respectively, and wherein X+Y+Z=100 and X is from about 50 to 80, Y is between 0 and about 20, and Z is from 0 to about 50. Preferably, the HB1 layer 30 has a composition that is 78.6 atomic % Co, 5.2 atomic % Cr, and 16.2 atomic % Pt which is hereafter referred to as $Co_{78.6}Cr_{5.2}Pt_{16.2}$. This composition is typically employed in prior art CoCrPt hard bias layers. The Cr component serves to improve corrosion resistance and magnetic domain structure while the Pt component is used to control coercivity. The thickness of the HB1 layer 30 is from about 10 to 50 Angstroms. The thickness may be adjusted to optimize the Hc, Mrt, and S values for the hard bias structure 32. It is understood that each of the layers in the hard bias structure 32 has a Hc, Mrt, and S component and that magnetic coupling between the layers produces Hc, Mrt, and S values for the hard bias structure that influences the adjacent free layer 25 and ensures a single domain state formed therein. Note that the CoCrPt alloy of the present invention encompasses a CoPt layer (Y=0) and a CoCr layer (Z=0).

Alternatively, the HB1 layer 30 may be comprised of another material such as FePt that has a high coercivity and good lattice matching with a BCC underlayer 29 and with a BCC seed layer 28. Preferably, the HB1 layer has a minimum Hc value of greater than 1000 Oe and has an Mrt value in the range of about 0.1 to 0.5.

In the embodiment where the HB1 layer 30 is comprised of a $Co_{78.6}Cr_{5.2}Pt_{16.2}$ layer, the HB2 layer 31 preferably has a thickness between about 50 and 300 Angstroms and a composition represented by $Co_XCr_YPt_Z$ in which X, Y, and Z are the atomic % of Co, Cr, and Pt, respectively, and wherein X+Y+Z=100 and X is about 65, Y is about 15, and Z is about 20 which is hereafter referred to as $Co_{65}Cr_{15}Pt_{20}$. The inventors have surprisingly found that a composite hard bias layer with a $Co_{78.6}Cr_{5.2}Pt_{16.2}/Co_{65}Cr_{15}Pt_{20}$ (HB1/HB2) configuration has a higher coercivity than a single hard bias layer based on a $Co_{78.6}Cr_{5.2}Pt_{16.2}$ alloy. As shown in Table 1, the thickness of the HB2 layer 31 may also be adjusted to optimize $H_C$ and Mrt values for the hard bias structure 32. Preferably, the HB2 layer 31 thickness is about 2 to 10 times that of the HB1 layer 30 thickness and the combined thicknesses of the HB1 and HB2 layers is between about 150 and 350 Angstroms. At least one of the HB1 and HB2 layers 30, 31 forms an abutting junction with the free layer 25 in the GMR element. A higher Cr content in the HB2 layer provides for more grain segregation while a higher Pt content provides for a higher coercivity and lower moment than in the HB1 layer.

TABLE 1

Magnetic Properties of Hard Bias Structure on a 30 Angstrom thick CrTi Seed Layer

| Sample | FeCoMo (Angstroms) | $Co_{78.6}Cr_{5.2}Pt_{16.2}$ (Angstroms) | $Co_{65}Cr_{15}Pt_{20}$ (Angstroms) | Mrt | Hc (Oe) | S | S* |
|---|---|---|---|---|---|---|---|
| S1 | — | 130 | — | 1 | 1925 | 0.89 | 0.93 |
| S2 | — | 50 | 150 | 1 | 2350 | 0.9 | 0.93 |
| S3 | 15 | 130 | — | 1.34 | 1350 | 0.88 | 0.93 |
| S4 | 15 | 50 | 150 | 1.33 | 1573 | 0.89 | 0.92 |
| S5 | 15 | 40 | 130 | 1.16 | 1511 | 0.89 | 0.92 |
| S6 | 20 | 40 | 150 | 1.35 | 1422 | 0.89 | 0.93 |
| S7 | 20 | 30 | 140 | 1.22 | 1385 | 0.89 | 0.93 |

In Table 1, samples S1 and S3 are examples of prior art hard bias structures previously employed by the inventors. Note that while the insertion of a FeCoMo underlayer in S3 has the desired effect of increasing Mrt (memμ/cm$^2$) compared to that of S1, the Hc value suffers a substantial reduction. One advantage of the present invention is that when no underlayer is present on the seed layer, a composite hard bias layer such as the one represented by the $Co_{78.6}Cr_{5.2}Pt_{16.2}/Co_{65}Cr_{15}Pt_{20}$ (HB1/HB2) configuration in S2 provides a higher coercivity than a single $Co_{78.6}Cr_{5.2}Pt_{16.2}$ hard bias layer in S1. This advantage also holds for the $Co_{78.6}Cr_{5.2}Pt_{16.2}/Co_{65}Cr_{15}Pt_{20}$ configuration on a FeCoMo underlayer (S4) compared to a $Co_{78.6}Cr_{5.2}Pt_{16.2}$/FeCoMo stack in S3. Thus, in a hard bias structure where a BCC underlayer is inserted to increase Mrt, the composite hard bias layer of the present invention is able to increase the coercivity (Hc) with a minimal effect on Mrt. Furthermore, the inventors have verified that asymmetry sigma is lowered when a composite HB1/HB2 hard bias layer of the present invention is incorporated in a hard bias structure with a BCC underlayer.

Samples S5, S6, and S7 show various thicknesses for the HB1 and HB2 layers and demonstrate that the Mrt can be fine tuned to provide an optimum value for Hc which in this case occurs for sample S4. Meanwhile, a high squareness (S) value and a high coercive force angle ratio (S*) are maintained in all samples with the HB1/HB2 composite hard bias layer. A second advantage as a result of the capability to fine tune the Mrt value is that a higher process window may be realized when forming the hard bias structure. In other words, by simultaneously optimizing Mrt and Hc, small variations in the thickness of the layers within the hard bias structure 32 will have a minimal effect on Mrt and Hc.

In an alternative embodiment where the HB1 layer 30 is formed of a material other than a CoCrPt alloy, a HB2 layer 31 composition is selected that has a high coercivity, a magnetic moment similar to that of $Co_{65}Cr_{15}Pt_{20}$ and which provides good lattice matching with the HB1 layer. Furthermore, the HB1 and HB2 layer requirements and relationships described earlier are also applicable in this case. The thicknesses of the HB1 and HB2 layers 30, 31 may be adjusted to optimize Hc and Mrt values for the hard bias structure 32.

The present invention also encompasses a hard bias structure 32 wherein the HB2 layer 31 is formed directly on the BCC underlayer 29 and has a composition represented by $Co_XCr_YPt_Z$ in which X, Y, and Z are the atomic % of Co, Cr, and Pt, respectively, and wherein X+Y+Z=100 and X is about 65, Y is about 15, and Z is about 20. Preferably, the HB2 layer 31 is a $Co_{65}Cr_{15}Pt_{20}$ layer. In other words, the thickness (and moment contribution) from the HB1 layer 30 can be reduced to zero. Since a $Co_{65}Cr_{15}Pt_{20}$ layer has a smaller magnetic moment (~40% less) than a $Co_{78.6}Cr_{5.2}Pt_{16.2}$ layer, the thickness of the HB2 layer 31 is increased in order to match the total Mrt of a composite $Co_{78.6}Cr_{5.2}Pt_{16.2}/Co_{65}Cr_{15}Pt_{20}$ layer. Optionally, the HB2 layer is made thicker to match the Mrt of a $Co_{78.6}Cr_{8.2}Pt_{16.2}$ layer such as sample S1 that is used in the prior art. The HB2 layer when formed on the BCC underlayer 29 may have a thickness in the range of about 50 to 300 Angstroms. As a result of the thicker $Co_{65}Cr_{15}Pt_{20}$ layer along the junction edge with the free layer 25, the junction coverage will be more uniform and the coercivity of the HB2 layer 31 along the tapered junction edge will be larger. Furthermore, a $Co_{65}Cr_{15}Pt_{20}$ layer has smaller anisotropy energy than a $Co_{78.6}Cr_{5.2}Pt_{16.2}$ layer and therefore tends to have less easy axis dispersions when it is exchanged coupled with a magnetic underlayer such as FeCoMo. The inventors have surprisingly found improved performance when a $Co_{65}Cr_{15}Pt_{20}$/FeCoMo hard bias structure is substituted for the $Co_{78.8}Cr_{5.2}Pt_{16.2}$/FeCoMo configuration in sample S3 (Table 1).

The properties of the hard bias structure of the present invention are very stable with or without annealing. Although no annealing is necessary, the hard bias structure 32 may be annealed by heating the substrate 21 at a temperature of about 200° C. to 250° C. in a $N_2$ ambient for a period of about 0.5 to 5 hours.

An electrical lead 33 is deposited by a sputtering or IBD method on the HB2 layer 31 on each side of the GMR element. Although the leads 33 are connected to the sides of the GMR element on the top portion 26 in the exemplary embodiment, the present invention also anticipates a configuration in which the leads are attached to the top surface 26a (FIG. 4) of the top portion. The leads may be a composite layer in which a thicker conductive layer such as Au or Cu is sandwiched between thinner Ta layers. In one embodiment (not shown), the leads 29 are comprised of a 30 Angstrom thick first Ta layer on the HB2 layer 31, a 400 Angstrom thick gold or copper layer on the first Ta layer, and a 30 Angstrom thick second Ta layer on the gold or copper layer. The bottom Ta layer serves as an interrupt layer to provide a good crystallographic match between the HB2 layer 31 and the gold or copper lead layer.

Referring to FIG. 4, a conventional lift-off process is used to remove the photoresist layer 27 and the overlying seed layer 28, underlayer 29, HB1 and HB2 layers 30, 31 and the lead layer 33. A track width TW is defined as the distance between the leads 33 on the top surface 26a of the GMR element. A second gap layer 34 is disposed on the leads 33 and top portion 26 and a second shield layer 35 is formed on the second gap layer 34 to complete the magnetic read head 20. Note that the second shield layer 35 preferably has a smooth top surface in order to improve the process latitude for subsequent process steps that could involve a write head fabrication as an example.

A second embodiment will now be described in which a hard bias structure formed adjacent to a free layer in a magnetoresistive (MR) element is comprised of laminated hard bias layers. In the exemplary embodiment pictured in FIGS. 5-6, the hard bias structure is formed in a magnetic read head and adjacent to a GMR element that was described previously in the first embodiment. However, the second embodiment also encompasses any configuration where a hard bias structure described herein forms an abutting junction with a free layer in a MR element.

Figure 5:
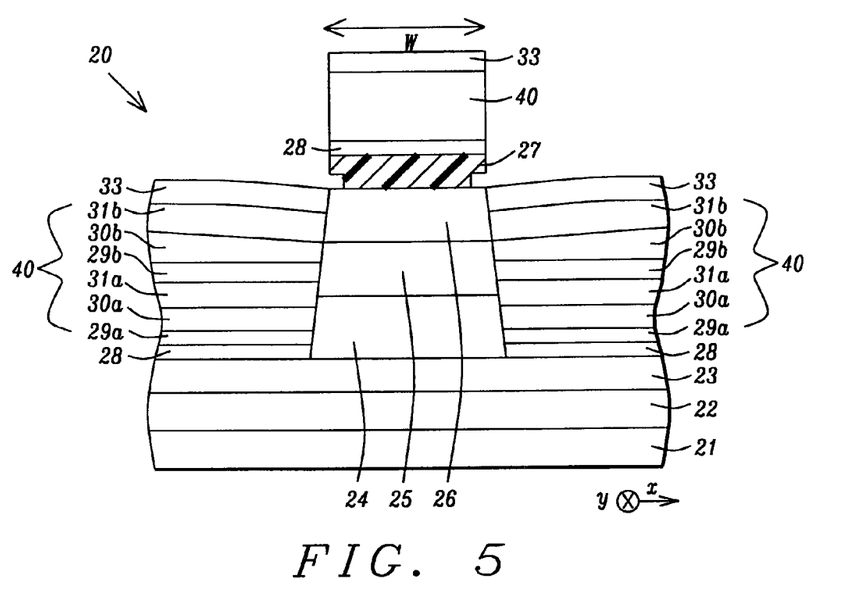
FIG. 5 is a cross-sectional view that depicts an intermediate step in the method of forming a laminated hard bias structure in a magnetic read head according to a second embodiment of the present invention.

Referring to FIG. 5, a first shield layer 22 and a first gap layer 23 are provided on a substrate 21 as previously described. Likewise, a GMR element comprised of a bottom portion 24, a free layer 25, and a top portion 26 is then fabricated on the first gap layer according to a method described in the first embodiment in which a patterned photoresist layer 27 having a width w serves as an etch mask. A seed layer 28 comprised of CrTi with a thickness of about 30 Angstroms is deposited on the exposed regions of the first gap layer 23 by a sputtering or IBD process. Alternatively, the seed layer 28 may be one of TiW, CrMo, or another material that has a body centered cubic (BCC) lattice structure and good lattice matching with a subsequently deposited underlayer and hard bias layer.

An important feature of the present invention is the hard bias structure 40 which is deposited on the seed layer 28. In one aspect, the hard bias structure 40 is made of laminated layers in which a stack comprised of an underlayer 29 and a composite hard bias layer on the underlayer is repeated two or more times to form a plurality of stacks. For example, a bottom layer in a second stack is formed on the top layer of a first stack and so forth. Optionally, the underlayer 29 may be omitted from one or more stacks in the hard bias structure although this arrangement is generally less desirable. In the exemplary embodiment, a second stack of three layers is formed on a first stack of three layers. However, more than two stacks of layers may be formed as appreciated by those skilled in the art. The laminated hard bias structure 40 is fabricated by a conventional means which may involve magnetron sputtering, for example.

The first stack of three layers in the hard bias structure 40 consists of an underlayer 29a, a lower hard bias (HB1) layer 30a, and an upper hard bias (HB2) layer 31a. In one aspect, the underlayer 29a is a FeCoMo layer that has a composition represented by $Fe_R Co_S Mo_T$ wherein R, S, and T are the atomic % of Fe, Co, and Mo, respectively, and wherein R+S+T=100 and R is from about 10 to 90, S is between about 10 and 90, and T is from about 5 to 20. Preferably, the thickness of the underlayer 29a is from about 5 to 40 Angstroms but may vary depending upon the desired thickness of the hard bias structure, the number of stacks employed, and the thickness of the overlying composite hard bias layer. The underlayer 29a has a high magnetic moment and a lattice structure intermediate between that of the seed layer 28 and the HB1 layer 30a in order to provide good lattice matching. Optionally, the underlayer 29a may be made of a BCC ferromagnetic material such as FeCo, FeCoCr, FeCr, FeV, FeTa, FePd, FeHf, FePt, FeW, or the like that has a high magnetic moment represented by the equation $4\pi Ms \geq 10000$ and which has good lattice matching with hard bias layers such as those based on a CoCrPt alloy.

In one embodiment, the HB1 layer 30a is comprised of a CoCrPt alloy that has a composition represented by $Co_X Cr_Y Pt_Z$ in which X, Y, and Z are the atomic % of Co, Cr, and Pt, respectively, and wherein X+Y+Z=100 and X is from about 50 to 80, Y is between 0 and about 20, and Z is from 0 to about 50. Preferably, the HB1 layer 30a is a $Co_{78.6}Cr_{5.2}Pt_{16.2}$ layer. The thickness of the HB1 layer 30a is from about 10 to 50 Angstroms but may vary depending on the number of stacks in the laminated hard bias structure and may be adjusted to optimize the Hc, Mrt, and S values for the hard bias structure 40. It is understood that each of the layers in the hard bias structure 40 has a Hc, Mrt, and S component and that magnetic coupling between the layers produces Hc, Mrt, and S values for the hard bias structure that influences the adjacent free layer 25 and ensures a single domain state formed therein.

Alternatively, the HB1 layer 30a may be comprised of another material such as FePt that has a high coercivity and good lattice matching with a BCC underlayer 29a and with a BCC seed layer 28. Preferably, the HB1 layer has a minimum Hc value of greater than 1000 Oe and has an Mrt value in the range of about 0.1 to 0.5.

In the embodiment where the HB1 layer 30a is comprised of a $Co_{78.6}Cr_{5.2}Pt_{16.2}$ layer, the HB2 layer 31a preferably has a thickness between about 50 and 300 Angstroms and is a $Co_{65}Cr_{15}Pt_{20}$ layer. The inventors have unexpectedly found that a composite hard bias layer with a $Co_{78.6}Cr_{5.2}Pt_{16.2}/Co_{65}Cr_{15}Pt_{20}$ (HB1/HB2) configuration has a higher coercivity than a single hard bias layer based on a $Co_{78.6}Cr_{5.2}Pt_{16.2}$ alloy. The thickness of the HB2 layer 31a may also be adjusted to optimize $H_C$ and Mrt values in the hard bias structure 40. Preferably, the HB2 layer 31a thickness is about 2 to 10 times that of the HB1 layer 30a thickness and the combined thicknesses of the HB1 and HB2 layers in the first stack is between about 150 and 350 Angstroms.

In an alternative embodiment where the HB1 layer 30a is formed of a material other than a CoCrPt alloy, a HB2 layer 31a composition is selected that has a high coercivity, a magnetic moment similar to that of $Co_{65}Cr_{15}Pt_{20}$ and which provides good lattice matching with the HB1 layer and with a subsequently formed underlayer 29b in the second stack.

A second stack of layers is formed on the HB2 layer 31a and is comprised of from bottom to top in order, a second underlayer 29b, a second HB1 layer 30b, and a second HB2 layer 31b. The composition and film thickness of the second underlayer 29b is preferably the same as that described for the underlayer 29a. Similarly, the composition and thickness of the second HB1 layer 30b and the second HB2 layer 31b are preferably the same as the composition and thickness of the hard bias layers 30a, 31a respectively. However, the thickness and composition of each of the layers in the first and second stack may be adjusted to provide optimum Hc and Mrt values for the hard bias structure 40. Note that at least one of the layers in the hard bias structure forms an abutting junction with an adjacent free layer.

The present invention also encompasses a laminated hard bias structure 40 wherein the HB2 layers 31a, 31b are preferably $Co_{65}Cr_{15}Pt_{20}$ layers and are formed directly on the BCC underlayers 29a, 29b, respectively. In other words, the thickness (and moment contribution) from the HB1 layers 30a, 30b can be reduced to zero and the second underlayer 29b is formed on first HB2 layer 31a. Since a $Co_{65}Cr_{15}Pt_{20}$ layer has a smaller magnetic moment (~40% less) than a $Co_{78.6}Cr_{5.2}Pt_{16.2}$ layer, the thicknesses of the HB2 layers 31a, 31b are increased accordingly in order to match the total Mrt of a $Co_{78.6}Cr_{5.2}Pt_{16.2}$ layer or a composite $Co_{78.6}Cr_{5.2}Pt_{16.2}/Co_{65}Cr_{15}Pt_{20}$ layer as referred to in Table 1. At least one of the HB2 layers 31a, 31b adjoins each side of the free layer 25. The advantages of a hard bias structure comprised of a BCC underlayer/$Co_{65}Cr_{15}Pt_{20}$ configuration are similar to those mentioned in the first embodiment.

Although no annealing is necessary to stabilize the properties of the layers within the hard bias structure 40, the hard bias structure may be annealed by heating the substrate 21 at a temperature of about 200° C. to 250° C. in a $N_2$ ambient for a period of about 0.5 to 5 hours.

Electrical leads 33 are formed on the hard bias structure 40 by a conventional process. In one embodiment, the leads 33 are comprised of a composite Ta/Au/Ta layer in which a 30 Angstrom thick first Ta layer is sputter deposited on the hard bias structure 40, a 400 Angstrom thick Au layer is sputter deposited on the first Ta layer, and a 30 Angstrom thick second Ta layer is sputter deposited on the Au layer. Optionally, Cu may be used in place of Au in the lead layer. Although the leads 33 are shown connected to the sides of the top portion 26 of the GMR element, the invention also anticipates a configuration in which the leads are attached to the top surface 26a of the top portion 26.

Figure 6:
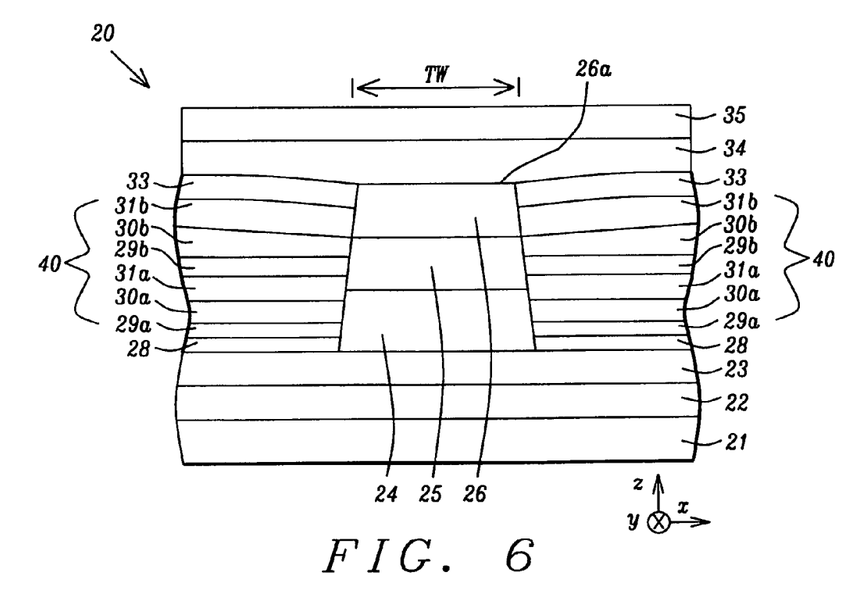
FIG. 6 is a cross-sectional view of a magnetic read head in which a laminated hard bias structure comprised of a CoCrPt composite hard bias layer on a BCC underlayer is formed adjacent to a GMR element according to the second embodiment.

Referring to FIG. 6, the photoresist layer 27 and overlying seed layer 28, hard bias structure 40, and lead 33 are removed by a well known lift off process to leave the top surface of the top portion 26 exposed between the leads 33. A second gap layer 34 is deposited on the leads 33 and top portion 26 as described previously. Subsequently, a second shield layer 35 is formed on the second gap layer 34 according to the process included in the first embodiment.

The advantages of the second embodiment are the same as described in the first embodiment. First, the hard bias structure of the present invention provides a higher coercivity than a single hard bias layer based on $Co_{78.6}Cr_{5.2}Pt_{16.2}$ or CoPt in the prior art. Moreover, in a hard bias structure where a BCC underlayer is inserted to increase Mrt, the hard bias structure of the present invention is able to increase the coercivity (Hc) with a minimal effect on Mrt. In other words, the loss in Hc due to insertion of an underlayer in the hard bias structure of the present invention is compensated by the higher initial Hc value generated by the composite hard bias layer or by a thicker $Co_{65}Cr_{15}Pt_{20}$ layer. As a result, the output asymmetry is reduced during a read operation.

Another advantage is the capability to fine tune the Mrt value so that a higher process window may be realized when forming the hard bias structure. Therefore, small variations in the thickness of the various layers within the hard bias structure will have a minimal effect on the magnitude of the Hc and Mrt values.

While this invention has been particularly shown and described with reference to, the preferred embodiment thereof, it will be understood by those skilled in the art that various changes in form and details may be made without departing from the spirit and scope of this invention.

We claim:

1. A hard bias structure for providing a longitudinal bias to a free layer in a spin valve within a magnetic read head, comprising:
    (a) a first composite hard bias layer formed on a substrate and on either side of a spin valve, comprising:
        (1) a first hard bias layer with a first thickness, a coercivity (Hc), a top surface, and an Mrt value; and
        (2) a second hard bias layer formed on the top surface of the first hard bias layer, said second hard bias layer has a second thickness greater than said first thickness, an Mrt value, and a coercivity greater than that of the first hard bias layer; and
    (b) a second composite hard bias layer formed on said first composite hard bias layer, comprising:
        (1) a third hard bias layer with a top surface, and a first thickness, coercivity, and Mrt value essentially the same as that of the first hard bias layer; and
        (2) a fourth hard bias layer formed on the top surface of the third hard bias layer, said fourth hard bias layer has a thickness, coercivity, and Mrt value essentially the same as that of the second hard bias layer;
    wherein at least one of the first, second, third, or fourth hard bias layers contacts said free layer in the spin valve.

2. The hard bias structure of claim 1 wherein said first and third hard bias layers are comprised of $Co_{78.6}Cr_{5.2}Pt_{16.2}$, and the second and fourth hard bias layers are comprised of $Co_{65}Cr_{15}Pt_{20}$.

3. A hard bias structure for providing a longitudinal bias to a free layer in a spin valve within a magnetic read head, comprising:
    (a) a first underlayer that has a body centered cubic (BCC) lattice structure and is formed on a substrate and on either side of said spin valve;
    (b) a first composite hard bias layer formed on the first underlayer and on either side of a spin valve, comprising:
        (1) a first hard bias layer with a first thickness, a coercivity (Hc), a top surface, and an Mrt value; and
        (2) a second hard bias layer formed on the top surface of the first hard bias layer, said second hard bias layer has a second thickness greater than said first thickness, an Mrt value, and a coercivity greater than that of the first hard bias layer;
    (c) a second underlayer formed on the first composite hard bias layer; and
    (d) a second composite hard bias layer formed on the second underlayer, comprising:
        (1) a third hard bias layer with a top surface, and a first thickness, coercivity, and Mrt value essentially the same as that of the first hard bias layer; and
        (2) a fourth hard bias layer formed on the top surface of the third hard bias layer, said fourth hard bias layer has a thickness, coercivity, and Mrt value essentially the same as that of the second hard bias layer;
    wherein at least one of the first, second, third, or fourth hard bias layers contacts said free layer in the spin valve.

4. The hard bias structure of claim 3 wherein said first and third hard bias layers are comprised of $Co_{78.6}Cr_{5.2}Pt_{16.2}$, and the second and fourth hard bias layers are comprised of $Co_{65}Cr_{15}Pt_{20}$.

5. The hard bias structure of claim 3 wherein said first and second underlayers have the same composition that is one of FeCo, FeCoCr, FeCr, FeV, FeTa, FePd, FeHf, FePt, or FeW.

6. A method of forming a hard bias structure in a magnetic read head based on an MR element, comprising:
    (a) providing a substrate on which an MR element having a top surface and two sides and that is comprised of a free layer which has two sidewalls coincident with said sides is formed;
    (b) forming a seed layer on said substrate and adjacent to each side of said MR element;
    (c) depositing a first BCC underlayer on said seed layer;
    (d) depositing a first composite hard bias layer on said first BCC underlayer, said first composite hard bias layer comprises:
        (1) a lower first hard bias layer that has a first thickness, coercivity, and a top surface; and
        (2) a second hard bias layer formed on the top surface of the lower first hard bias layer and having a second thickness greater than the first thickness and a coercivity greater than that of the first hard bias layer;
    (e) depositing a second BCC underlayer on the first composite hard bias layer; and
    (f) depositing a second composite hard bias layer on the second BCC underlayer, said second composite hard bias layer comprises:
        (1) a lower third hard bias layer with a top surface, and a thickness and coercivity essentially the same as the first hard bias layer; and
        (2) a fourth hard bias layer formed on the top surface of the third hard bias layer, said fourth hard bias layer has a thickness, coercivity, and Mrt value essentially the same as that of the second hard bias layer;
    wherein at least one of the first, second, third, or fourth hard bias layers contacts said free layer in the spin valve.

7. The method of claim 6 wherein said first and third hard bias layers are comprised of $Co_{78.6}Cr_{5.2}Pt_{16.2}$, and the second and fourth hard bias layers are comprised of $Co_{65}Cr_{15}Pt_{20}$.

8. The method of claim 6 wherein said first and second underlayers have the same composition that is one of FeCo, FeCoCr, FeCr, FeV, FeTa, FePd, FeHf, FePt, or FeW.

* * * * *